(12) United States Patent
Smiley, III et al.

(10) Patent No.: US 8,366,377 B2
(45) Date of Patent: Feb. 5, 2013

(54) FC FAN FLOW MEASUREMENT SYSTEM USING A CURVED INLET CONE AND PRESSURE SENSOR

(75) Inventors: William A. Smiley, III, La Crosse, WI (US); Brian L. Reynolds, Onalaska, WI (US)

(73) Assignee: Trane International Inc., Piscataway, NJ (US)

( * ) Notice: Subject to any disclaimer, the term of this patent is extended or adjusted under 35 U.S.C. 154(b) by 305 days.

(21) Appl. No.: 12/798,684

(22) Filed: Apr. 9, 2010

(65) Prior Publication Data
US 2011/0250051 A1 Oct. 13, 2011

(51) Int. Cl.
*F01D 25/00* (2006.01)
*F24F 11/02* (2006.01)
*G01F 1/34* (2006.01)

(52) U.S. Cl. ............. 415/1; 415/118; 417/44.2; 417/53

(58) Field of Classification Search ............... 417/44.2, 417/53; 415/418, 118, 1; 73/861.42, 861.52, 73/861.61, 861.64, 861.66
See application file for complete search history.

(56) References Cited

U.S. PATENT DOCUMENTS

| | | | |
|---|---|---|---|
| 1,897,858 A | | 2/1933 | Peck |
| 4,086,781 A * | | 5/1978 | Brody et al. .................... 62/180 |
| 4,178,804 A * | | 12/1979 | Potter ............................. 73/702 |
| 5,050,092 A | | 9/1991 | Perry |
| 5,340,271 A * | | 8/1994 | Freeman et al. ................. 415/1 |
| 5,426,975 A * | | 6/1995 | Stark ............................... 73/202 |
| 5,505,763 A | | 4/1996 | Reighard et al. |
| 5,586,861 A * | | 12/1996 | Berger ........................... 415/118 |
| 6,186,744 B1 * | | 2/2001 | Wolochuk ..................... 417/44.2 |
| 6,241,463 B1 * | | 6/2001 | Bahner et al. .................... 415/17 |
| 6,298,912 B1 * | | 10/2001 | Rayburn et al. ................ 165/249 |
| 6,439,061 B1 * | | 8/2002 | Nelson et al. ............... 73/861.65 |
| 6,923,072 B2 * | | 8/2005 | Modera et al. .................. 73/861 |
| 8,070,423 B2 * | | 12/2011 | Vogel et al. ..................... 415/118 |
| 2004/0251344 A1 * | | 12/2004 | Lutton et al. ..................... 241/47 |

FOREIGN PATENT DOCUMENTS

| | | |
|---|---|---|
| DE | 10 2004 038 523 A1 | 3/2006 |
| EP | 0 419 798 A1 | 4/1991 |
| EP | 419798 A * | 4/1991 |
| EP | 0 626 519 A1 | 11/1994 |
| EP | 2 093 428 A1 | 8/2009 |

OTHER PUBLICATIONS

Machine Translation of EP0419798 dated Apr. 3, 1991.*

* cited by examiner

*Primary Examiner* — Devon Kramer
*Assistant Examiner* — Nathan Zollinger
(74) *Attorney, Agent, or Firm* — William O'Driscoll

(57) ABSTRACT

An airflow volume sensing system for determining the flow rate through a fan includes a curved inlet cone with a pressure sensor at the minimum diameter of the cone, wherein the flow volume sensing system is particularly suited for FC centrifugal fans (centrifugal fans with forward curved fan blades). With an FC fan, the minimum diameter of the inlet cones interior surface is adjacent the fan wheel, and the static pressure there is at a minimum value. A predetermined relationship between the static gage pressure at that point and the volume flow rate through the fan is applied regardless of variables such as fan speed, fan housing geometry, supply air duct configurations, return air duct configurations, location of various heat exchangers or filters, etc. In some examples, a single pressure sensor senses an average of a plurality of pressure taps wherein each tap is at approximately the same minimum pressure.

6 Claims, 7 Drawing Sheets

FC FAN FLOW MEASUREMENT SYSTEM USING A CURVED INLET CONE AND PRESSURE SENSOR

BACKGROUND OF THE INVENTION

1. Field of the Invention

The subject invention generally pertains to centrifugal fans and more specifically to flow measuring systems for such fans.

2. Description of Related Art

The volume of air flowing through a fan can be difficult to determine because the air velocity usually varies depending on the location of the air streams within the fan or within the ducts leading to or from the fan. In some cases, a series of pressure taps distributed across the flow path provides a means for integrating the air's velocity profile, from which the total airflow volume can be determined. Inserting such pressure taps across the flow path, however, can disrupt and restrict the flow.

In other cases, the air is directed through a certain flow restriction for which there is a known relationship between the volume airflow rate and the resulting pressure drop across the restriction. Such an approach, however, can present an undesirable flow restriction and requires multiple pressure taps to sense the pressure drop across the restriction.

SUMMARY OF THE INVENTION

It is an object of some embodiments to determine the volume airflow rate through a centrifugal fan by using as few as just one pressure gage and without creating an undesirable pressure drop or flow obstruction.

Another object of some embodiments is to use a single pressure senor for sensing an average of a plurality of pressure taps, wherein each tap is at approximately the same subatmospheric pressure.

Another object of some embodiments is to determine the volume airflow rate through a centrifugal fan by sensing the minimum static pressure of the air entering the fan, whereby the reading is more accurate due to a relatively large or maximum pressure differential between the sensed minimum subatmospheric static pressure and the ambient barometric pressure.

Another object of some embodiments is to add a pressure sensor to a curved inlet cone that can be applied to a centrifugal fan for determining the air volume throughput regardless of changeable or unknown variables, examples of which include, but are not limited to, fan speed, fan housing geometry, fan blade length (actual or effective), discharge airflow resistance, supply air duct configurations, return air duct configurations, size and location of various heat exchangers or filters, etc.

Another object of some embodiments is to provide a simple means for determining the volume airflow rate through a centrifugal fan, wherein the means is particularly suited for fans with forward curved fan blades (FC type centrifugal fans).

Another object of some embodiments is to shelter a static pressure receiver within a discharge air chamber of a centrifugal fan, thereby protecting the static pressure receiver from damage while providing a neat appearance.

In some embodiments, the present invention provides a fan system for drawing suction air and discharging discharge air. The fan system comprising a fan housing providing a suction inlet opening for receiving the suction air and defining a discharge air chamber within the fan housing for the discharge air. The fans system also includes a centrifugal fan wheel disposed within the fan housing between the suction inlet opening and the discharge air chamber and being rotatable to force air from the suction inlet opening to the discharge air chamber. A curved inlet cone encircles the suction inlet opening. The curved inlet cone includes a minor diameter and a major diameter. The minor diameter is in proximity with the centrifugal fan wheel and is downstream of the major diameter. A static pressure receiver disposed within the discharge air chamber is connected in fluid communication with the suction air flowing through the curved inlet cone. A pressure sensor connected in fluid communication with the static pressure receiver is responsive to a static gage pressure of the suction air to provide a pressure signal indicative of the static gage pressure of the suction air at the minor diameter.

In some embodiments, the present invention provides a fan system for drawing suction air and discharging discharge air. The fan system comprises a fan housing providing a suction inlet opening for receiving the suction air and defining a discharge air chamber within the fan housing for the discharge air. A centrifugal fan wheel is disposed within the fan housing between the suction inlet opening and the discharge air chamber and is rotatable to force air from the suction inlet opening to the discharge air chamber. A curved inlet cone encircles the suction inlet opening. The curved inlet cone includes a minor diameter and a major diameter. The minor diameter is in proximity with the centrifugal fan wheel and is downstream of the major diameter. The inlet cone decreases in diameter continuously from the major diameter to the minor diameter. The inlet cone terminates at an inlet edge at the minor diameter. A static pressure receiver in proximity with the inlet edge is connected in fluid communication with the suction air flowing through the curved inlet cone. A pressure sensor connected in fluid communication with the static pressure receiver is responsive to a static gage pressure of the suction air to provide a pressure signal indicative of the static gage pressure of the suction air, wherein the suction air is at a minimum static gage pressure where the static pressure receiver is connected in fluid communication with the suction air flowing through the curved inlet cone.

In some embodiments, the present invention provides a fan system method using a centrifugal fan wheel rotating within a fan housing for drawing suction air and discharging discharge air. The method comprises rotating a centrifugal fan wheel within a fan housing, wherein the fan housing defines a suction inlet opening for receiving suction air and defines a discharge air chamber for the discharge air. The method includes conveying the discharge air as supply air from the discharge air chamber to a comfort zone. The method includes circulating the supply air through the comfort zone to create return air. The method includes conveying from the comfort zone at least some of the return air to the suction inlet opening of the fan housing. While conveying at least some of the return air to the suction inlet opening, the method includes conveying the suction air through a curved inlet cone that leads to the suction inlet opening, wherein the suction air includes at least some of the return air, the curved inlet cone includes a minor diameter and a major diameter, and the minor diameter is in proximity with the centrifugal fan wheel and is downstream of the major diameter. The method includes sensing, at an inner surface of the curved inlet cone at the minor diameter, a static gage pressure of the suction air. The method includes determining a total volume flow rate of the suction air flowing through the curved inlet cone based on the static gage pressure of the suction air at the inner surface at the minor diameter.

DESCRIPTION OF THE PREFERRED EMBODIMENT

Figure 1:
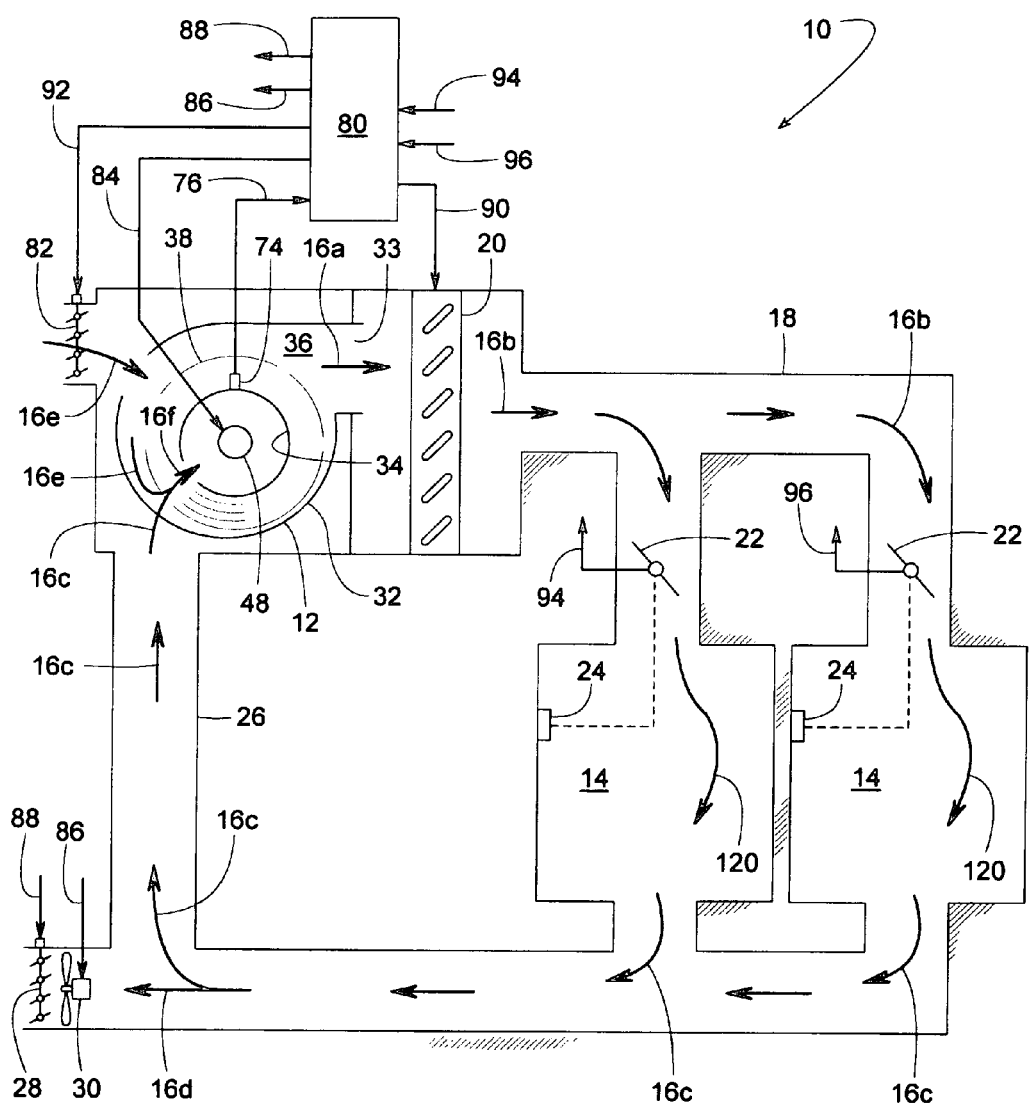
FIG. 1 is a schematic diagram of one example fan system.
Figure 2:
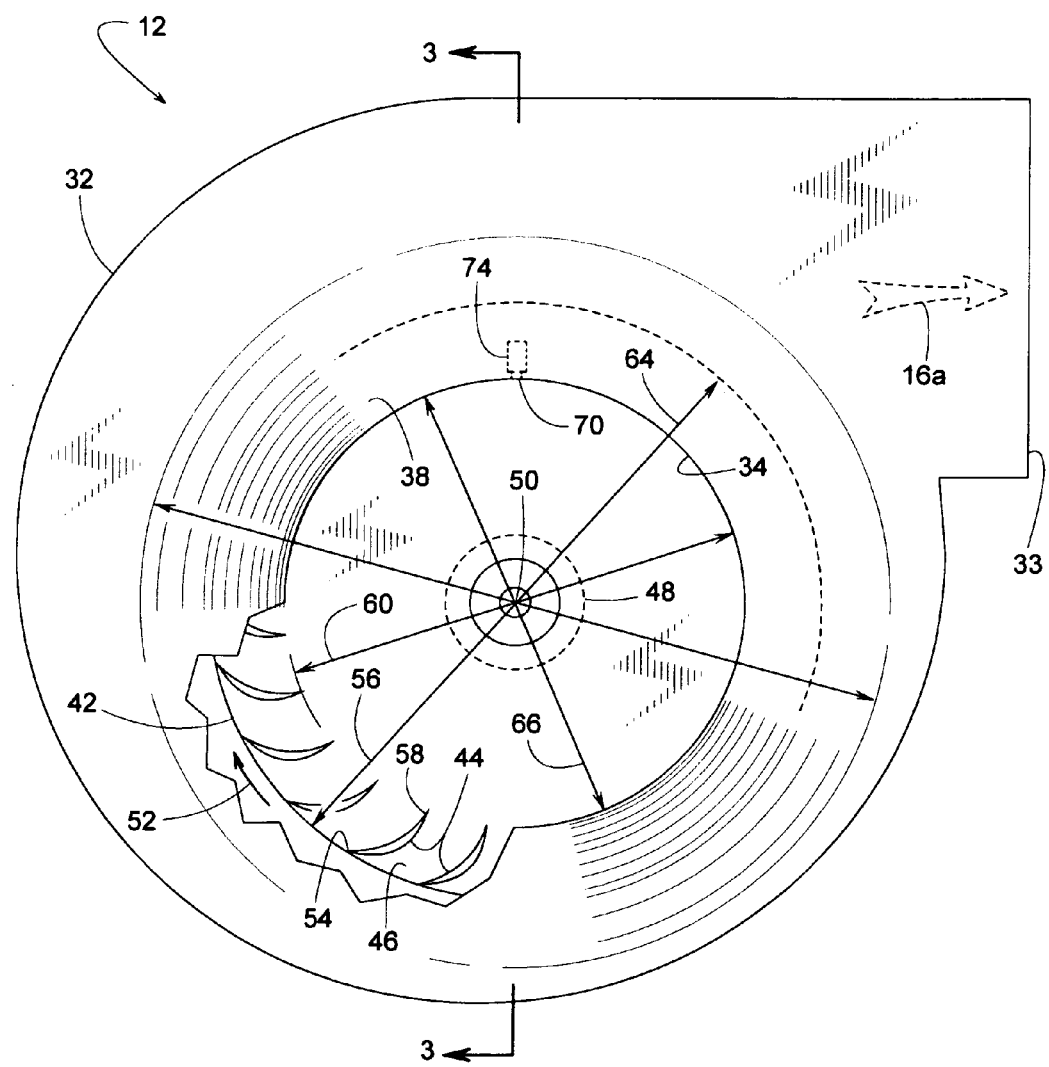
FIG. 2 is a cutaway side view of an example fan used in the fan system of FIG. 1.
Figure 3:
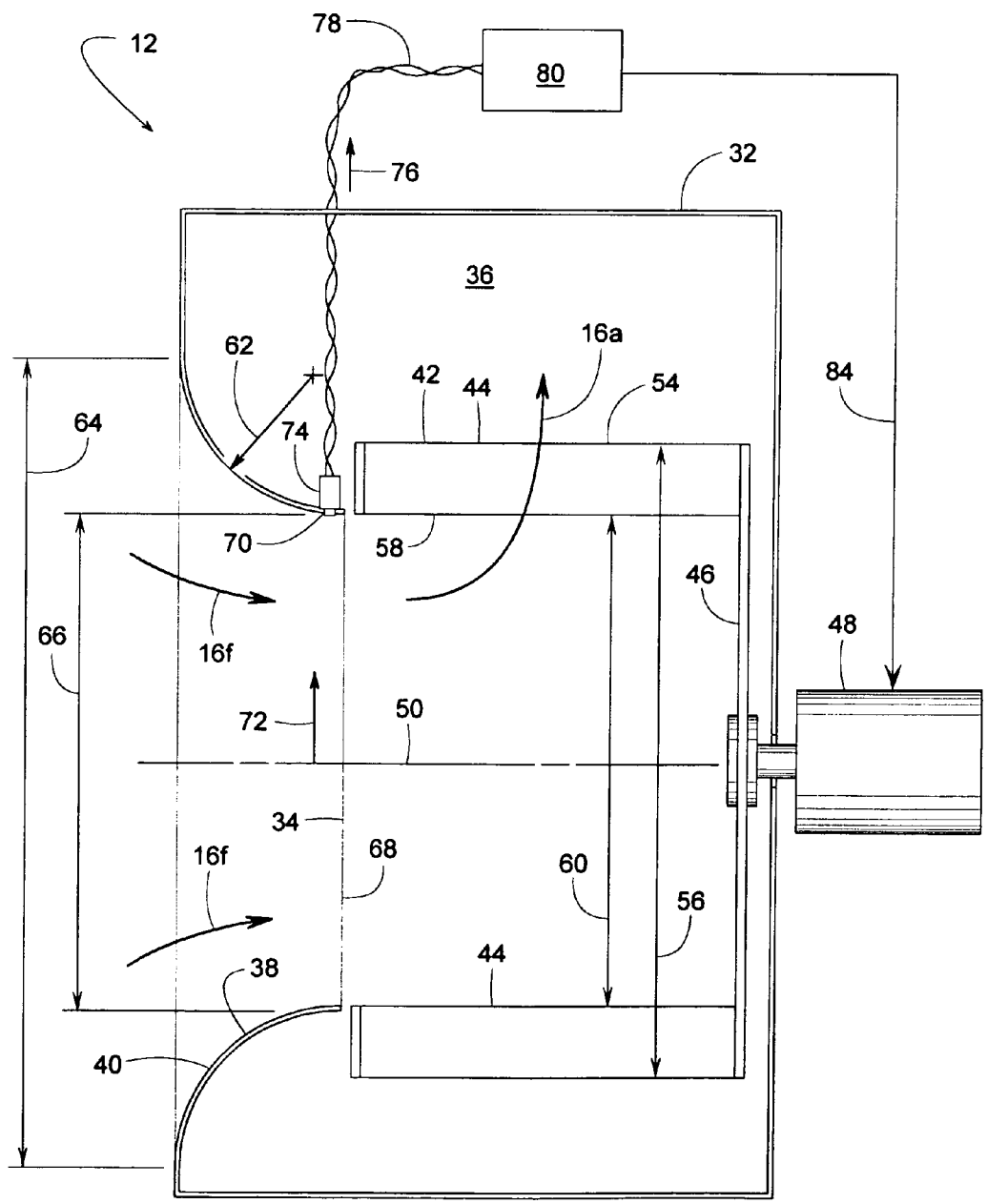
FIG. 3 is a cross-sectional view taken along line 3-3 of FIG. 2.

FIG. 1 schematically illustrates one example of a fan system 10 with a centrifugal fan 12 with additional views of fan 12 being shown in FIGS. 2 and 3. A novel means for determining the total volume airflow rate through fan 12 is used, in some cases, to help ensure that fan 12 delivers the proper amount of conditioned air and/or fresh outside air to a plurality of comfort zones 14, such as rooms or other designated areas of a building. Examples of conditioned air include, but are not limited to, air that has been heated, cooled, filtered, humidified, dehumidified, and various combinations thereof.

In the illustrated example, fan 12 discharges a current of discharge air 16a that is known as supply air 16b as a supply air duct 18 conveys the air to comfort zones 14. In this particular example, a heat exchanger 20 heats, cools, or otherwise conditions the current of air moved by fan 12. To meet the individual conditioned-air demands of zones 14, a plurality of adjustable VAV valves 22 (variable air volume valves) provide variable flow restrictions for regulating the amount of air delivered to each zone 14. In some embodiments, each zone 14 has a thermostat 24 that controls its respective VAV valve 22. After flowing through comfort zones 14, supply air 16b becomes return air 16c, which flows to a return air duct 26 and/or flows out through an exhaust air damper 28, with exhausted air 16d being forced outside by a fan 30. The portion of return air 16c that is not exhausted mixes with fresh incoming outdoor air 16e to create suction air 16f that feeds fan 12.

Fan 12 includes a fan housing 32 with a suction inlet opening 34 through which suction air 16f enters fan 12. In this example, housing 32 is a scroll shell with a discharge air chamber 36 for discharge air 16a, which exits housing 32 through a discharge opening 33. Housing 32 also includes a curved inlet cone 38 encircling inlet opening 34. Inlet cone 38 has a curved inner surface 40 that smoothly guides suction air 16f into housing 32.

To force the air from inlet 34 to discharge chamber 36, fan 12 has a centrifugal fan wheel 42 that rotates within housing 32. Fan wheel 42 comprises a plurality of fan blades 44 attached to a fan disc 46. A motor 48 coupled to fan disc 46 rotates fan wheel 42 about an axis 50 in the direction indicated by arrow 52. In this example, fan blades 44 are referred to as FC blades (forward-curved blades) because the blades lean forward with respect to the fan wheel's direction of rotation 52. Each blade 44 includes a trailing edge 54 at an outer diameter 56 of fan wheel 42 and a leading edge 58 at an inner diameter 60 of wheel 42, wherein leading edge 58 is upstream of trailing edge 54 with respect to airflow across fan blade 44.

In the example where fan blades 44 are curved forward, the ideal curvature of the inlet cone's inner surface 40 creates an effective radius 62 that in some examples is a true radius. In other examples, however, the curvature of inner surface 40 is parabolic, hyperbolic or otherwise deviates from a perfect circular segment having a perfect radius.

Moreover, in cases where fan blades 44 are curved forward, the ideal inlet cone decreases in diameter continuously from a maximum major diameter 64 to a minor diameter 66. At minor diameter 66, inlet cone 38 terminates at an inlet edge 68 that is in proximity with fan wheel 42. In this case, the term, "proximity," means inlet edge 68 is positioned sufficiently close to fan wheel 42 to create appreciable airflow resistance to leakage between edge 68 and fan wheel 42.

Blades 44 being curved forward in combination with inlet cone 38 being smoothly curved and terminating at its minor diameter 66 in proximity with fan wheel 42 provides a surprising and unexpected opportunity for measuring total airflow volume through fan 12. Although the suction air's velocity and thus its static pressure varies over a cross-sectional area of suction inlet opening 34, it has been discovered that the total airflow volume can be determined by sensing the static pressure (gage pressure) at a single-point tap location 70 on inlet cone 38 at minor diameter 66. It turns out that the total airflow volume through inlet 34 and fan 12 is approximately proportional to an exponential function (e.g., square-root) of the static gage pressure at point 70. This method makes it unnecessary to sense a plurality of static pressure readings to determine the actual airflow velocity profile over a cross-sectional area of inlet 34.

With total airflow volume (CFM) being proportional to an exponential of the static gage pressure (SGP), their relationship can be expressed as, $CFM=(k)(SGP)^x$. The term, "k," is a predetermined constant chosen to fit a fan's particular curved inlet cone. The term, "x" is an exponent that approximately equals 0.5 when inlet cone 38 is curved with an effective radius 62 that creates an airflow velocity profile that, through a cross-sectional area of inlet opening 34, varies approximately inversely proportionally to radial distance 72 from axis 50. With this relationship for a given curved inlet cone, a fan's throughput can be determined even as other variables change, such as fan speed, fan housing geometry, fan blade length (actual or effective), discharge airflow resistance, supply air duct configurations, return air duct configurations, size and location of various heat exchangers or filters, etc.

In the example shown in FIGS. 1-3, a single pressure sensor 74 is attached to inlet cone 38 to sense the static gage pressure at point 70. Sensor 74, in some examples, is a differential pressure gage that determines the static gage pressure at point 70 by measuring the difference between the absolute static pressure at point 70 and the ambient barometric air pressure outside of fan housing 32. A pressure signal 76 indicative of the static gage pressure is conveyed along wires 78 to a controller 80 that uses the information for one or more various reasons, examples of which include, but are not limited to, for controlling the speed of motor 48 to achieve a desired airflow rate, for controlling fan 30 or exhaust damper 28, for controlling the operation of heat exchanger 20, for controlling a incoming outdoor air damper 82, and for simply monitoring the flow rate through fan 12. In some examples, controlling motor 48, fan 30, exhaust damper 28, heat exchanger 20, outdoor air damper 82 is accomplished via output signals 84, 86, 88, 90 and 92, respectively. In some examples, output signal 84 for adjusting the speed of fan motor 48 varies in response to controller 80 receiving valve position signals 94 and 96 from VAV valves 22, wherein controller 80 adjusts the speed of fan motor 48 to provide a desired volume of supply air 16*b* that is appropriate for the degree to which VAV valves 22 are open.

Figure 4:
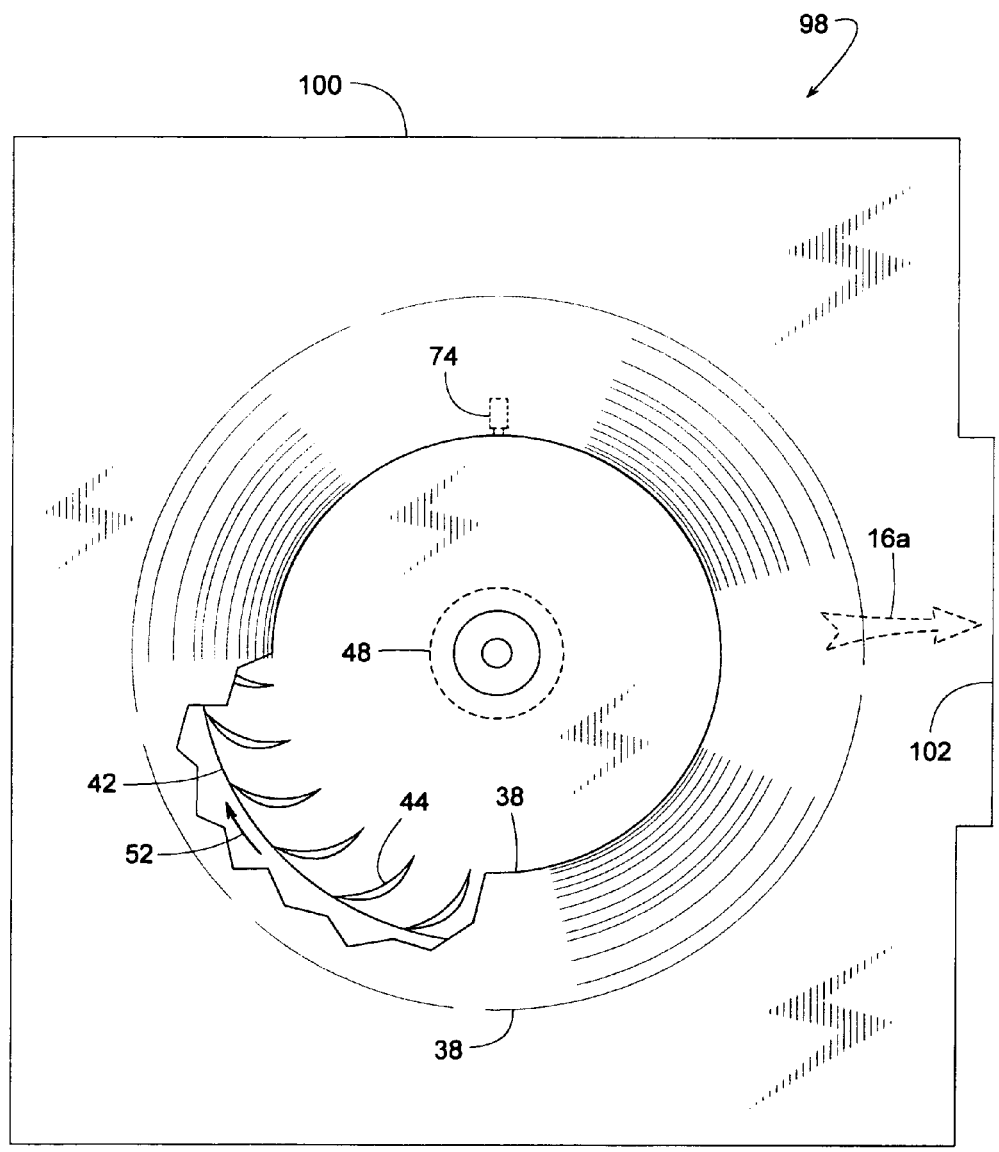
FIG. 4 is a cutaway side view similar to FIG. 2 but showing another example fan.

It should be appreciated that system 10 of FIG. 1 is just one of many possible example systems to which the present airflow measuring system can be applied. Also, fan housing 32 does not necessarily have to be of a scroll design. FIG. 4, instance, shows fan wheel 42, pressure sensor 74 and curved inlet cone 38 being used with a plenum fan 98 having a box-like fan housing 100 with a side discharge opening 102.

Figure 5:
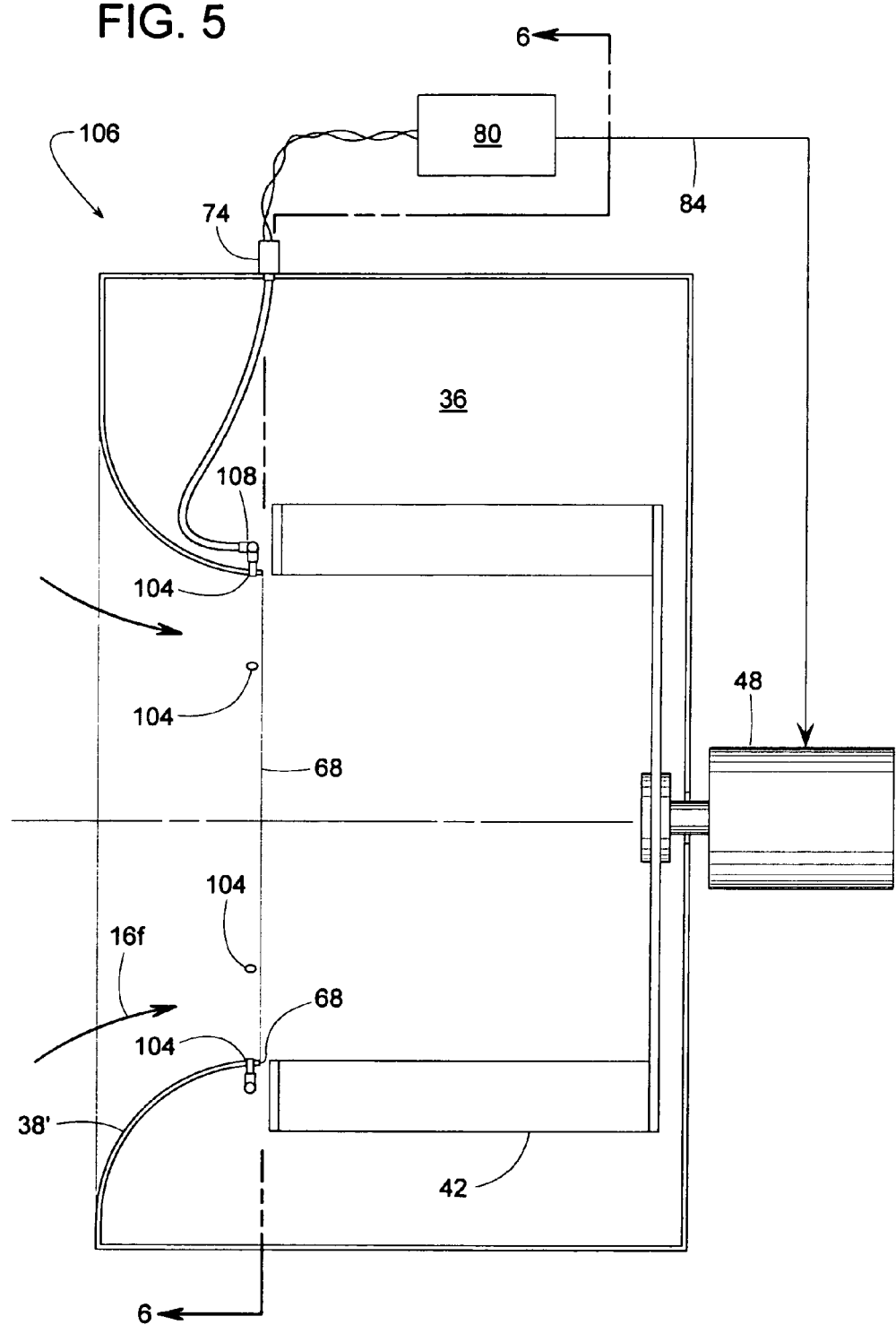
FIG. 5 is a cross-sectional view similar to FIG. 3 but showing the fan with an alternate means for sensing the static pressure.
Figure 6:
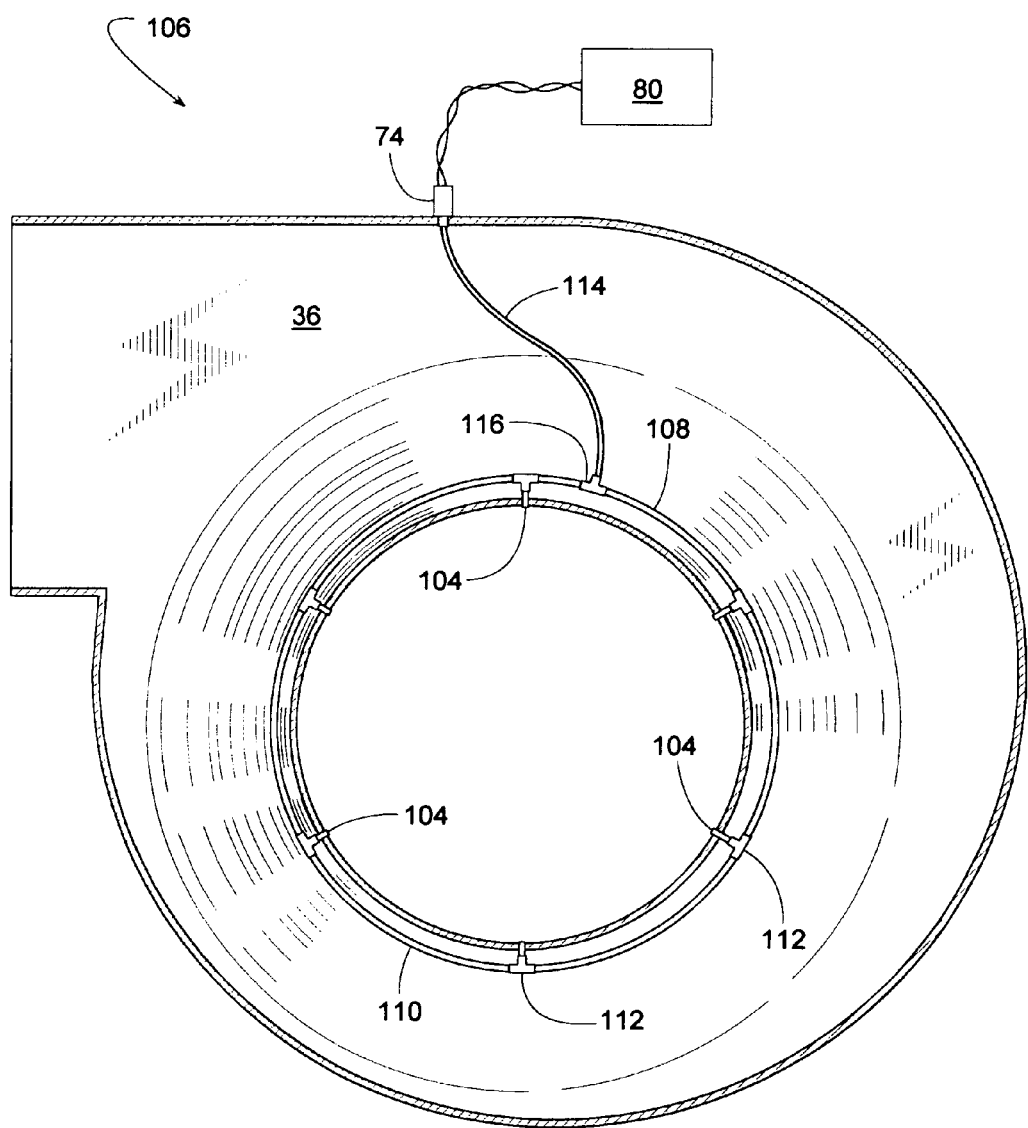
FIG. 6 is a cross-sectional view taken along line 6-6 of FIG. 5.

Referring to FIGS. 5 and 6, although a single-point static pressure measurement will suffice in some applications, a more significant reading might be acquired by sensing the average pressure at a plurality of points 104 circumferentially distributed around a curved inlet cone 38' in proximity with inlet edge 68. In this case, the expression, "in proximity," means that points 104 are sufficiently close to inlet edge 68 that the static pressure at points 104 is substantially at a minimum as compared to all other points along inlet cone 38'.

In this example, a fan 106 includes a static pressure receiver 108 disposed within discharge chamber 36, wherein static pressure receiver 108 is connected in fluid communication with suction air 16*f* at points 104. The expression, "static pressure receiver," refers to any structure, conduit or feature for connecting a pressure transducer in fluid communication with suction air flowing through a curved inlet cone of a fan. In the example of FIGS. 1-3, the static pressure receiver and the pressure transducer are incorporated within pressure sensor 74 itself. In the example of FIGS. 5 and 6, static pressure receiver 108 further comprises a circular manifold 110 or tube with T-connectors 112 at each point 104. A tube 114 connects static gage pressure sensor 74 to a T-connector 116 that places pressure sensor 74 in fluid communication with manifold 110 and points 104.

Figure 7:
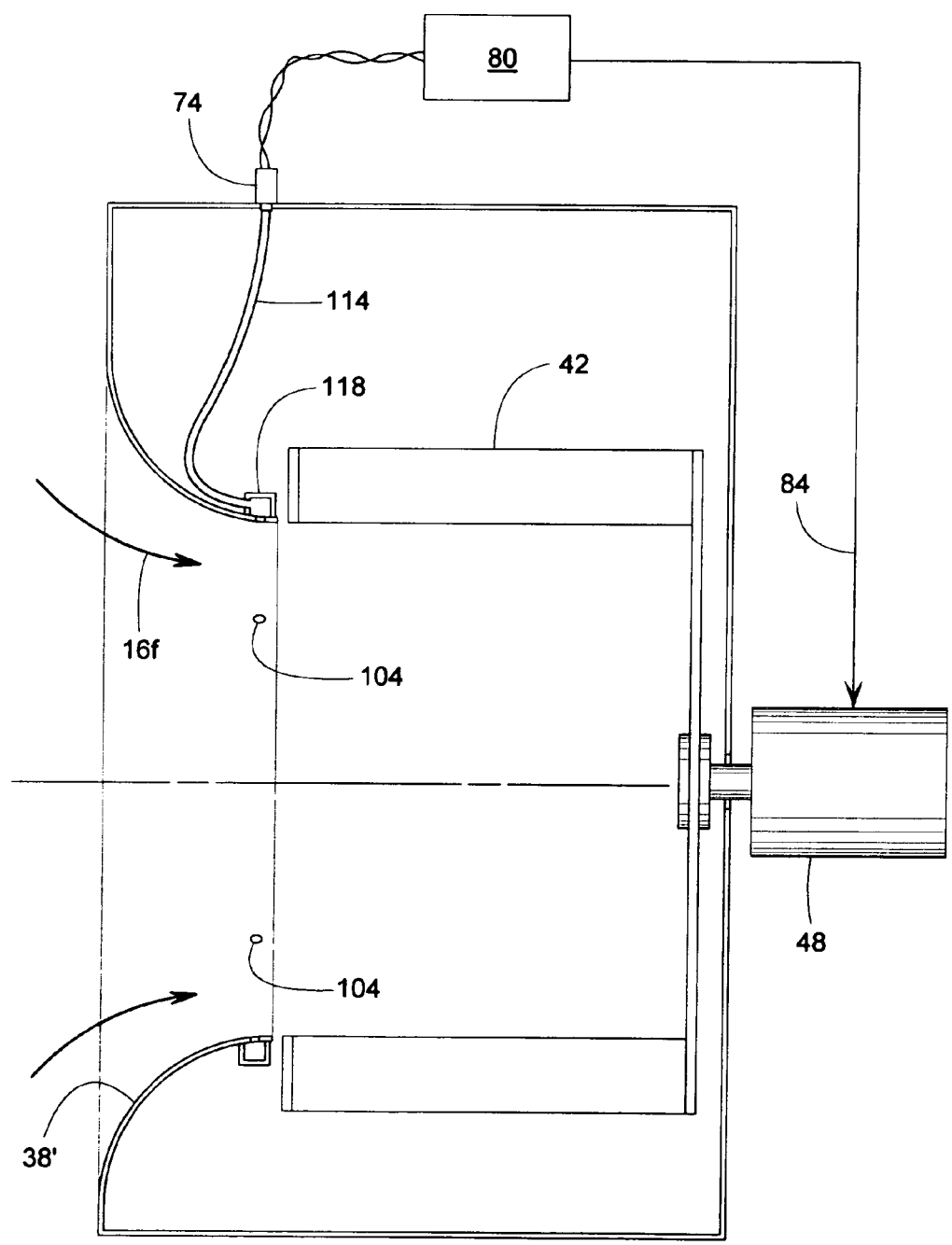
FIG. 7 is a cross-sectional view similar to FIG. 5 but showing an alternate static pressure receiver.

In a similar example, shown in FIG. 7, manifold 110 is replaced by a circular channel 118 that encircles inlet cone 38' to connect tube 114 in fluid communication with points 104.

It should be noted that arrow 52 represents rotating a centrifugal fan wheel; supply air duct 18 represents conveying discharge air 16*a* as supply air 16*b* from discharge air chamber 36 to comfort zone 14; arrows 120 represent circulating supply air 16*b* through comfort zone 14 to create return air 16*c*; the arrow of return air 16*c* (immediately below fan 12) represents conveying from comfort zone 14 at least some of return air 16*c* to suction inlet opening 34; the arrows of suction air 16*f* (FIG. 3) represents conveying suction air 16*f* through curved inlet cone 38; pressure senor 74 being shown connected in fluid communication with suction air 16*f* at points 70 and 104 represent sensing the static pressure of suction air 16*f* at an inner surface of a curved inlet cone; controller 80 and the expression $CFM=(k)(SGP)^x$ represents determining a total volume flow rate of suction air flowing through curved inlet cone 38; the arrow representing signal 76, controller 80 and the arrow representing signal 84 illustrates adjusting the rotational speed of a fan based on the static pressure of suction air 16*f* at inner surface 40 at minor diameter 66; and VAV valves 22 represent adjustably restricting the supply air flowing to comfort zones.

Although the invention is described with respect to a preferred embodiment, modifications thereto will be apparent to those of ordinary skill in the art. In some embodiments, for example, the fan blades extend radially straight and/or lean back (BI) rather than leaning forward. The scope of the invention, therefore, is to be determined by reference to the following claims:

The invention claimed is:

1. A fan system method using a centrifugal fan wheel rotating within a fan housing for drawing suction air and discharging discharge air, the method comprising:
   rotating a centrifugal fan wheel within a fan housing, wherein the fan housing defines a suction inlet opening for receiving suction air and defines a discharge air chamber for the discharge air;
   conveying the discharge air as supply air from the discharge air chamber to a comfort zone:
   adjustably restricting the supply air flowing to the comfort zone by way of a VAV valve that is one of a plurality of VAV valves used in the fan system method:
   circulating the supply air through the comfort zone to create return air;
   conveying from the comfort zone at least some of the return air to the suction inlet opening of the fan housing:
   while conveying at least some of the return air to the suction inlet opening, conveying the suction air through a curved inlet cone that leads to the suction inlet opening, wherein the suction air includes at least some of the return air, the curved inlet cone includes a minor diameter and a major diameter, the minor diameter is in proximity with the centrifugal fan wheel and is downstream of the major diameter, the inlet cone decreases in diameter continuously from the major diameter to the minor diameter, the inlet cone terminates at an inlet edge at the minor diameter;
   sensing, through an inner surface of the curved inlet cone at the minor diameter, a static gage pressure of the suction air:
   determining a total volume flow rate of the suction air flowing through the curved inlet cone based on the static gage pressure of the suction air at the inner surface at the minor diameter; and
   adjusting a rotational speed of the centrifugal fan wheel based on the static gage pressure of the suction air at the inner surface at the minor diameter.

2. The fan system method of claim 1, wherein the total volume flow rate of the suction air flowing through the curved inlet cone is determined based on a square-root of the static gage pressure multiplied by a predetermined constant.

3. The fan system method of claim 1, wherein sensing the static gage pressure of the suction air occurs at a plurality or points around the inner surface of the curved inlet cone at the minor diameter.

4. The fan system method of claim 1, wherein sensing the static gage pressure of the suction air occurs at a point on the inner surface of the curved inlet cone where the suction air is at a minimum static gage pressure.

5. The fan system method of claim 1, wherein the centrifugal fan wheel includes a plurality of forward-curved blades that define an inner diameter and an outer diameter of the centrifugal fan wheel, each forward-curved blade of the plurality of forward-curved blades includes a leading edge upstream of a trailing edge with respect to airflow across each respective forward-curved blade, the leading edge is on the outer diameter, and the trailing edge is on the inner diameter.

6. The fan system method of claim 1, wherein the inner surface of the curved inlet cone is substantially parabolic, and the fan housing is a box-like fan housing.

\* \* \* \* \*